March 1, 1938.                F. C. BEST                 2,109,815
                       VALVE OPERATING MECHANISM
                         Filed June 13, 1935            2 Sheets-Sheet 1
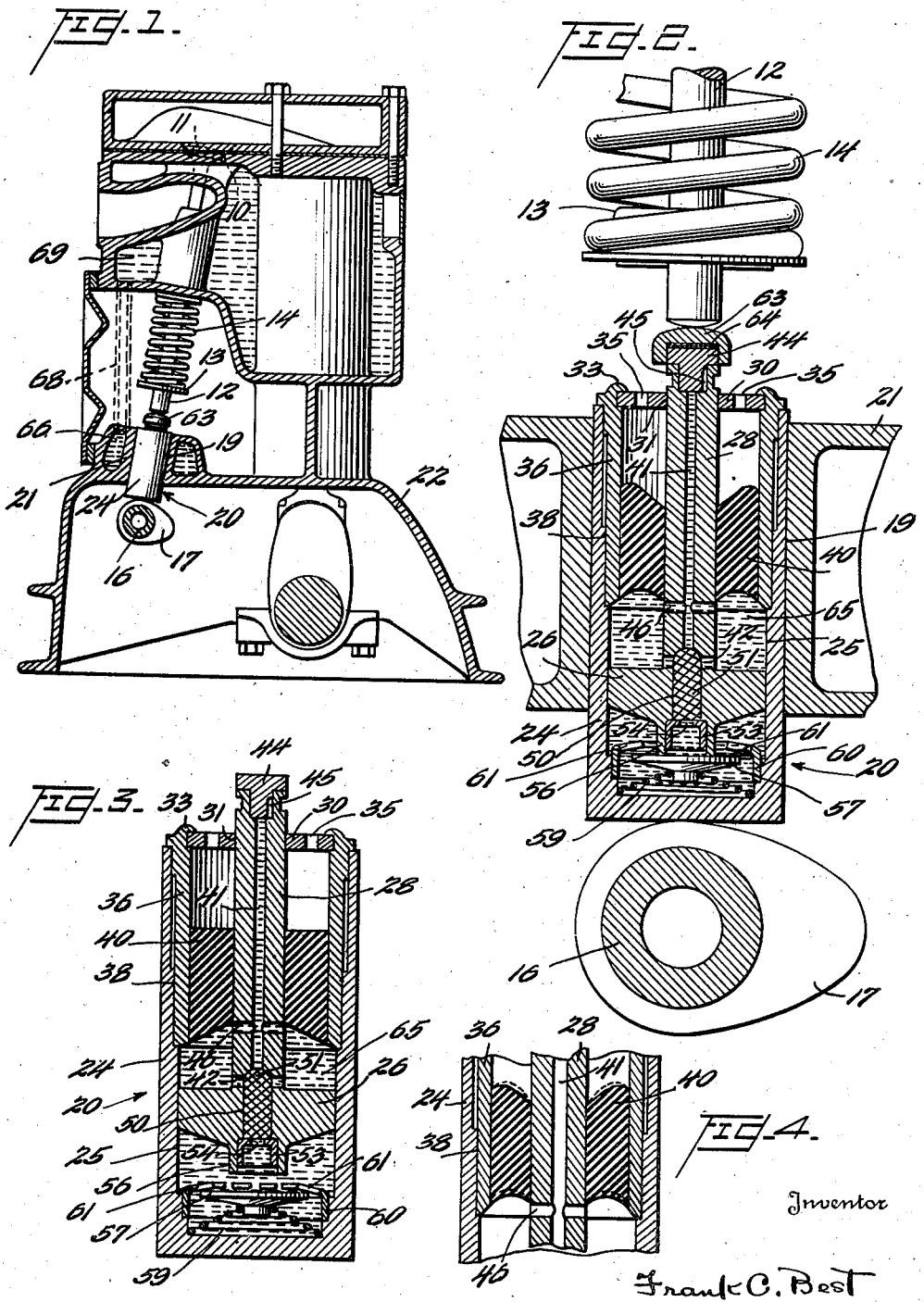
Inventor
Frank C. Best
By Watson, Coit, Morsea Grindle
Attorneys

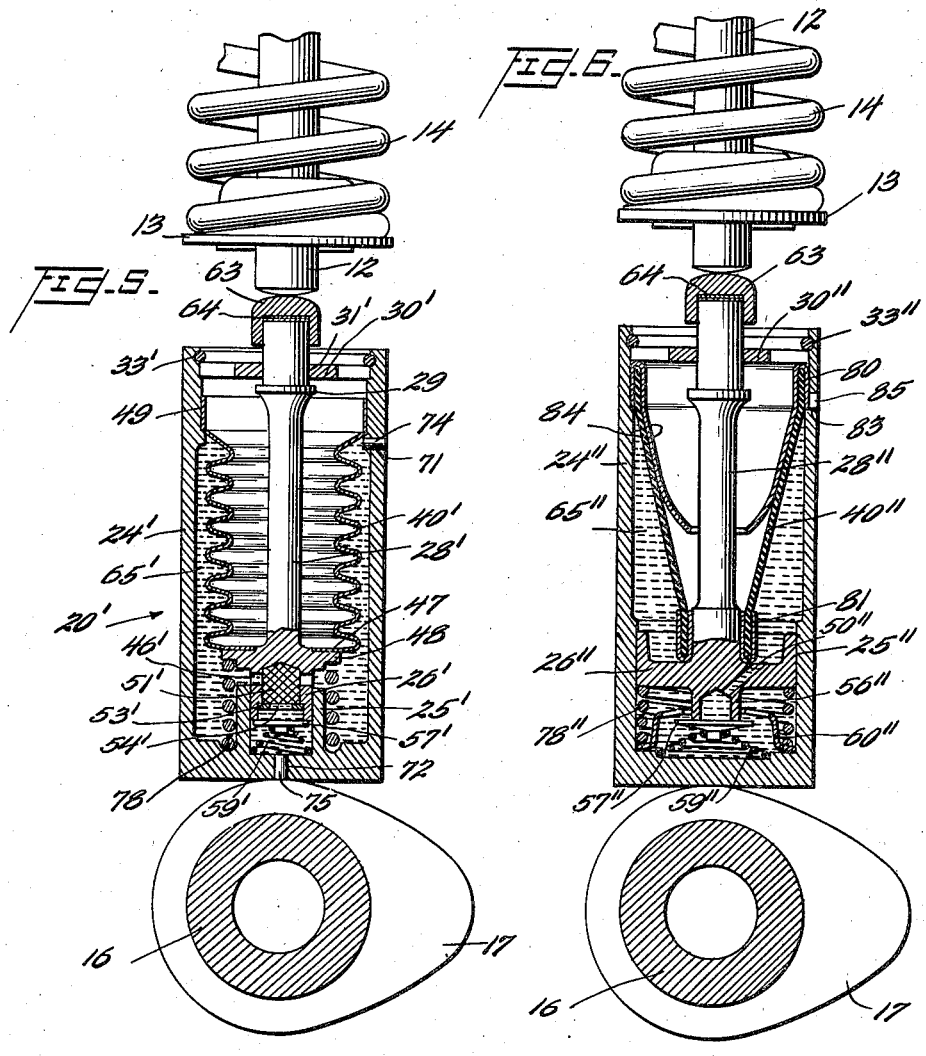

Patented Mar. 1, 1938

2,109,815

UNITED STATES PATENT OFFICE 2,109,815

VALVE OPERATING MECHANISM

Frank C. Best, Detroit, Mich., assignor to Packard Motor Car Company, Detroit, Mich., a corporation of Michigan Application June 13, 1935, Serial No. 26,483

26 Claims. (Cl. 123—90)

This invention relates to improvements in the operating mechanism for the valves of internal combustion engines and is more particularly concerned with means for eliminating clearance and play in the mechanism in order to secure more efficient and quiet operation of the valves.

It has heretofore been proposed to employ take-up devices of the general character indicated, but such devices have not proven wholly satisfactory in practice. Thus it is essential for satisfactory performance that such devices be capable of functioning properly over the extreme range of engine temperature, that they be capable of withstanding the very high stresses to which they are subjected when employed with modern high speed engines, and that they shall be of sufficiently small size and light weight to permit of use without adversely affecting the operation of conventional valve actuating mechanism or requiring material alteration of the design of such mechanism.

It is proposed by the present invention to meet these various requirements and to provide a small and compact device which is of light weight and which will function, for an indefinite period without any attention, to automatically regulate or eliminate clearance in the valve mechanism. In its more specific aspect the invention is concerned with the provision of a valve tappet which may be readily employed as a substitute for valve tappets or cam followers now commonly interposed between the cam shaft and the valve stem of poppet valves. It is a feature of the invention that the device, whether intended for use as a tappet or for association in some other way with conventional valve mechanism, may be readily assembled and sold as a complete unit.

It is a further object of the invention to provide a device of the character described in which a liquid medium is employed to oppose displacement of the working parts except when necessary for the purpose of taking up clearance in the valve mechanism, the construction preferably being such that the liquid may completely fill and be sealed within a closed fluid system, air being thus permanently excluded from the system so as to ensure uniformity of action.

An important feature of the invention is the provision in the device of means of a flexible nature which not only seals in the liquid and permits expansion thereof and relative displacement of the moving parts, but which also acts to effect displacement of the parts as clearance occurs in the valve actuating mechanism. Thus it is proposed to eliminate the coil spring heretofore provided in devices of this character with resultant simplification of the construction. In the preferred form of the invention sealing is effected by means formed of rubber or rubber-like material of a highly flexible nature and resistant to the action of the liquid which is to be employed in the system.

A further object of the invention is to promote uniformity of action in devices of the character described by the provision of cooling means, whereby the plurality of devices required for the several valves of the engine may be maintained at substantially the same temperature.

The invention further contemplates an improved method of assembling a clearance take-up device of the type employing a non-compressible fluid or liquid, whereby air may be discharged and the introduction of air into the fluid system permanently and completely eliminated. The method of assembly is preferably such that an initial compensation for variation in spacing between the valve stems and the valve cams of internal combustion engines may be effected and precise similarity of function of the devices used with a plurality of valves may be ensured.

Further objects and features of the invention will be apparent from the following description taken in connection with the accompanying drawings, in which Figure 1 is a transverse sectional view of a portion of an internal combustion engine illustrating the application of the invention to a valve tappet;

Figure 2 is a sectional view of the tappet and associated parts illustrating in more detail one form of the invention;

Figure 3 is a sectional view of the tappet shown in Figure 2 and illustrating the relationship of the several elements thereof before assembly in the engine;

Figure 4 is a partial sectional view illustrating the deformation of the sealing means occurring as the result of increase in the volume of liquid when heated;

Figures 5 and 6 are sectional views corresponding to Figure 2 and illustrating further modifications of the construction shown therein; and Figure 7 is an enlarged sectional view of the flexible sealing element shown in Figure 5 and illustrating the manner in which the same is deformed in response to variation in temperature.

In describing the invention reference is made to the preferred forms thereof illustrated in the accompanying drawings and specific language is employed. It will nevertheless be understood that no limitation of the scope of the invention is thereby intended and that various further modifications and alterations of the illustrated structure are contemplated.

In the arrangement shown in Figure 1 of the drawings and illustrated more particularly in Figures 2 to 4 inclusive, it will be observed that the valve stem is indicated at 12, the stem being provided with the usual spring seat 13 against which abuts the lower end of a coil spring 14, the latter serving to retain the head 11 of the valve on the valve seat 10 in the conventional manner. The valve is reciprocated on rotation of the cam shaft 16 which is provided with a radial cam 17, thrust being transmitted from the cam to the valve stem by means of a cam follower or tappet indicated generally at 20, the tappet being supported for reciprocating movement in a guide opening 19 formed in the stationary member 21, the latter preferably constituting a part of the engine block and crankcase 22. It will be appreciated that the structure thus far described is quite conventional and may assume other forms, the novel features of this embodiment of the invention residing in the construction of the valve tappet 20.

The valve tappet 20 is of the barrel type and includes an outer shell or casing 24 of generally cylindrical shape adapted to slidably engage the walls of the opening 19, the diameter and length of the casing 24 being preferably comparable to the corresponding dimensions of conventional valve tappets of the non-adjustable or manually adjustable type so that replacement may be readily made without alteration of engines constructed in accordance with standard practice. The interior of the casing 24 is preferably formed to provide a cylinder 25 within which reciprocates a piston 26, the latter having an outwardly directed stem 28. The casing 24 may be provided at its outer end with a closure member 30 having an opening 31 receiving the piston stem 28 and thus serving as a guide for the latter. This closure member may be formed integrally with or secured rigidly to a sleeve 36, for instance by the spinning over of a lip 33 against the outer surface of the closure member. The sleeve 36 is received in turn within an internally enlarged portion 38 of the casing 24 with a press fit so as to prevent leakage of liquid and to avoid unintentional displacement. The closure member 30 and sleeve 36 need not seal the outer end of the casing 24; on the contrary, apertures 35 are preferably provided in the member 30 to permit free flow of air into and out of the upper end of the casing 24.

An elastic member 40 which may comprise an annular block of rubber, rubberized material or the like which is resistant to penetration or attack by the liquid to be employed, surrounds the piston stem 28 and is surface bonded or otherwise secured to the stem and to the interior of the sleeve 36, for instance by vulcanization. The stem 28 is provided with a longitudinally extending passage 41 communicating at its lower end with a transverse passage 42 and being closed at its upper end by a plug 44, the latter having a recess 45 formed in one side thereof. A further transverse passage 46 intersecting the passage 41 may also be provided in the piston stem 28. The piston 26 and the lower end of the stem are recessed as indicated at 50 to receive a filter plug 51 of material permeable to liquid, for instance of a fibrous nature, and the plug 51 may be retained in position by means of a cup-shaped element 53, having an opening 54 therein, the cup-shaped element being pressed within a correspondingly annular projection 56 at the lower side of the piston 26. The annular projection 56 constitutes a valve seat with which a valve 57 is arranged to cooperate, a coil spring 59 being provided to normally press the valve against the seat and thus prevent flow of liquid from the inner to the outer side of the piston while permitting flow in the opposite direction. A valve retaining member 60 of generally annular shape having a plurality of inwardly directed fingers 61 is pressed in position in the lower end of the casing 24 and serves to limit outward movement of the valve 57.

The piston 26 preferably fits somewhat loosely within the cylinder 25; at least there is sufficient play to permit of seepage of liquid past the piston. Alternatively, a restricted by-pass may be provided to permit slow discharge of liquid from the closed end of the cylinder 25 into the reservoir 65 which is defined by the outer face of the piston 26 and the elastic member 40. This is essential in order that expansion of liquid within the cylinder may be permitted without consequent outward movement of the piston as the temperature of the engine and associated parts increases during operation.

It is essential in order to secure maximum efficiency in operation that the parts be assembled in such manner as to exclude air from the reservoir 65 and other liquid filled portions of the device. Obviously if air enters the closed end of the cylinder 25, even in extremely small quantity, downward movement of the piston 26 accompanied by compression of this air is likely to occur on the transmission of thrust through the tappet, thus defeating the purpose of the fluid system. If air is present at any point in the fluid system, for instance in the reservoir 65, it is likely that an emulsion of air and liquid will form which will result eventually in the introduction of air into the closed end of the cylinder 25 in the form of minute bubbles.

In assembling the device the following procedure may be resorted to. The valve 57 and spring 59 are first placed in position in the lower end of the casing 24 and are retained therein by pressing the member 60 in place as shown in Figure 3. The elastic member 40 is surface bonded to the sleeve 36 and piston stem 28, the filter plug 51 and element 53 are located in the piston 26, and the closure member 30 is placed and secured in position in the upper end of the casing 24. The casing 24 is now filled with liquid, for instance glycerin, oil, or the like, to a depth of about ¾ of the length of the casing, and the unit which has been assembled as described is introduced in the casing, the sleeve 36 being pressed downwardly until fully seated within the casing. It will be appreciated that as the piston 26 moves downwardly into the cylinder 25, the displaced liquid passes up through the unobstructed opening 54 and through the filter 51, into the reservoir 65, through the passage 42, and through the passages 46 and 41, being discharged at the outer end of the piston stem 28. The system has at this point been completely filled with liquid, and the plug 44 is pressed down in its seat in the upper end of the piston stem 28, excess liquid being forced out through the recess 45. When the plug reaches its fully seated position, further discharge of liquid is obviously prevented and no air can enter the system.

The tappet is now ready for use, the relation of the component parts thereof being as shown in Figure 3, and may be handled and shipped as a self-contained and complete unit without possibility of leakage, outward movement of the piston 26 and stem 28 being resisted by the elasticity of the member 40 which has not yet been stressed or deformed in a direction axially of the casing 24.

As hereinbefore suggested, the compactness of the several component parts of the device is such that the casing 24 may be of a diameter and length comparable to that of conventional valve tappets. The spacing between the lower end of the valve stem 12 to which the tappet is to be applied and the dwell portion of the cam 17 is measured and a retainer 63 is placed over the upper end of the block 44, a sufficient number of shims 64 being inserted beneath the retainer to ensure that when a series of valve tappets are associated in operative relation with the several valves of an internal combustion engine, the piston stem 28 of each tappet will be depressed substantially to the same extent from the position in which it is shown in Figure 3. In other words, it is highly desirable to place the elastic members 40 of the several valve tappets under the same degree of compression in order that uniform results may be secured, and this is facilitated by the use of the retainer 63 and shims 64, although it will be understood that some other form of manually adjustable device may be associated with the upper end of each piston stem 28.

As the tappet is placed in position as indicated in Figure 2, it is of course necessary to thrust the piston stem 28 downwardly thus distorting the elastic member 40 from the position shown in Figure 3 to that shown in Figure 2. this elastic member tending to return the stem 28 to its initial position and exerting a slight thrust upwardly on the stem, the amount of this thrust being of course substantially less than that exerted by the valve spring 14 to seat the engine valve. The valve 57 now seats on the projection 56 and prevents free flow of liquid outwardly of the cylinder.

On the occurrence of any clearance in the valve actuating mechanism, the length of the valve tappet will be expanded by outward movement of the stem 28 under the action of the elastic member 40, the latter also serving to completely seal the fluid system and to compensate for expansion of the liquid as the engine temperature increases. Inward movement of the stem 28 on the application of periodic impulses to the valve actuating mechanism on rotation of the cam shaft 16 is of course resisted by reason of the incompressible nature of the liquid beneath the piston 26. Nevertheless, seepage of liquid is permitted past the piston so that a portion of the liquid beneath the piston may be displaced into the reservoir 65 as the temperature increases. This displacement of liquid and accompanying expansion of liquid initially within the reservoir 65 is in turn permitted by deformation of the elastic member 40 which may assume the position shown in dotted lines in Figure 4 to afford increased capacity in the reservoir 65.

It will be observed that the valve retainer 60 serves to hold the valve 57 in assembled relation until such time as the unit is placed in operation. The filter plug 51 may be used or not as desired; if the foregoing method of assembling the elements of the tappet is followed, there is little possibility that air will be present in the fluid system. Nevertheless, in the event any minute quantities of air are present, the filter plug will effectively prevent the entry of such air into the cylinder below the piston 26 as the piston is displaced outwardly in taking up clearance in the valve mechanism.

It will be obvious that the tappet is so constructed that uniform action will result regardless of temperature changes. It may nevertheless be desirable to provide for the cooling of the several tappets of an engine so that they may acquire substantially the same temperature in operation. For this purpose it is proposed to cool the tappet guides by circulating the water of the engine cooling system past and in close proximity to the guides. The manner in which this may be effected is indicated in Figure 1 in which the member 21 is illustrated as provided with a jacket 66 surrounding the guide, the jackets for the several tappet guides of the engine being in communication, engine cooling water being conveyed by any convenient means from the cooling system adjacent the usual pump to one end of the series of jackets and being discharged at the other end, for instance by a conduit 68 into the main water jacket 69 of the engine. Obviously the details of this cooling arrangement may be varied to a considerable extent to suit the engine structure to which it is applied and to secure efficient circulation of cooling water about the tappet guides.

The invention is of course useful as a take-up device for valve mechanism whether embodied in a tappet or whether employed in some other relation to the mechanism. A further possible use of the device is illustrated, for instance, in the application of Cornelius W. Van Ranst, Serial No. 618,653, filed June 22, 1932.

Figure 5 of the drawings illustrates another embodiment of the invention which is quite similar to that hereinbefore described in structure and function, the principal difference residing in the employment of an elastic sealing member of the metallic bellows type and in other less important alterations in the details of construction. Thus the casing 24' of the tappet indicated generally at 20' is provided interiorly with an upstanding annular flange providing a cylinder 25' of reduced diameter, a piston 26' being supported for sliding movement in the cylinder with a fit permitting slight leakage of liquid past the piston. The piston proper is substantially cup-shaped and may receive a filter plug 51', the latter being retained in position by a ring 53' having a central aperture 54' therein, the ring 53' being pressed in the lower end of the piston. The piston also affords at its lower end a seat for a valve 57', which is normally retained in seated position by a coil spring 59'. The piston is further provided with a transverse passage 46' and at its upper end with an annular flange 48. The piston stem 28' which may be formed integrally with the piston is guided at its upper end in an opening 31' in a closure plate 30', the plate 30' being secured in position in the casing 24' by means of a locking ring 33'.

A flexible bellows 40' is secured as by welding or otherwise to the upper end of the casing 24' at 49 and to the flange 48 at 47 so as to provide with the casing 24' a liquid reservoir 65' which is completely sealed. An aperture 71 is provided in the side wall of the casing and an aperture 72 in the lower end of the casing, these apertures serving for the filling of the fluid system with liquid and being subsequently closed by plugs 74 and 75 respectively. It will be observed that movement of the piston stem 28' in both directions is limited. Thus on outward movement the shoulder 29 formed on the stem 28 engages the closure member 30', downward movement of the stem resulting in engagement of the flange 48 of the piston with the upper end of the cylinder 25'. The remaining elements of the device are unchanged and are designated by the reference numerals employed in connection with the form of the invention first described.

In this form of the invention the tappet may be assembled by positioning the valve 57' and spring 59' in the lower end of the cylinder 25', securing the flexible bellows 40' to the flange 48 of the piston and inserting the filter plug 51' in place, introducing the piston in the cylinder and securing the bellows to the upper end of the casing 24', positioning the closure member 30' and locking ring 33' to retain the component elements of the tappet in assembled position, and thereafter filling the fluid system with liquid. Liquid is preferably introduced through the opening 71, pressure being applied if necessary, with the tappet held in inverted position so that when the system is completely filled liquid will flow out of the aperture 72. Both apertures are then closed by means of the plugs 74 and 75 which may be driven in place, and the completely assembled unit is ready for handling and shipment.

In inserting several units in operative position in an engine, use is preferably made of some manually adjustable means such as the retainer 63 and shims 64 herebefore described, a sufficient number of shims being introduced to ensure that on insertion of the unit in the engine a small clearance will be established between the shoulder 29 of the piston stem 28' and the closure member 30', for instance .010 inch.

In its initial condition the bellows 40' is considerably shorter than is indicated in Figure 5. Thus during assembly of the unit the bellows is elongated and this elongation is slightly increased when the unit is inserted in the engine as the result of depression of the piston stem 28'. The elasticity of the bellows as the result of this deformation is such as to urge the piston stem 28' outwardly to an extent sufficient to take up any clearance in the valve actuating mechanism, liquid flowing past the one-way valve 57' to permit this expansion of the tappet. With such an arrangement it is therefore ordinarily unnecessary to employ any separate means for urging the piston outwardly, but if additional force becomes necessary or desirable, a coil spring 78 may be inserted beneath the flange 48 of the piston. However, the use of such a spring is not specifically claimed herein but constitutes a feature covered more particularly in my copending application Serial No. 26,484, filed June 13, 1935.

On starting the engine, the temperature is rapidly increased and liquid within the cylinder and below the piston expands, a portion of the liquid being forced past the piston. This displacement of liquid from the cylinder and the concurrent expansion of liquid within the reservoir 65' requires increase in the capacity of the reservoir, this being taken care of by deformation of the flexible bellows 40', the nature of this displacement of the bellows being indicated in dotted lines in Figure 7 of the drawings, little variation in the axial thrust of the bellows resulting from this deformation.

Figure 6 of the drawings illustrates a still further embodiment of the invention. In the arrangement shown in this figure, use is made, as in the first described embodiment of the invention, of a sealing means formed of rubber or the like, the principal difference residing in the structure and form of the sealing means. Thus it is proposed in this modification of the invention to utilize a flexible elongated sheath or sleeve 40" of relatively small thickness, this sleeve being secured at its opposite ends to and extending between the casing 24" and the piston 26". Preferably each end of the sleeve 40" is clamped in a substantially U-shaped clip of sheet metal or the like, the outer clip 80 having a pressed fit on the upper end of the casing 24" and the lower clip 81 having a pressed fit on the lower end of the piston stem 28" adjacent the piston 26". The outer clip 80 is extended at its inner side to form an inwardly directed generally conical member 84 which serves to reinforce the sleeve 40" and prevent excessive deformation of the latter.

The construction and mode of operation is otherwise quite similar to that shown in Figure 2 of the drawings. Thus the piston 26" slides in the cylindrical portion 25" of the casing 24" with sufficient clearance to permit slight leakage of liquid past the piston and is provided with a downwardly directed cup-shaped projection 56", the lower end of which affords a seat for the valve 57", the latter being urged outwardly by means of a coil spring 59". Communication is afforded between the liquid reservoir 65" and the interior of the cup-shaped projection 56" through a passage 50", the arrangement being such that liquid may flow freely into the closed end of the cylinder but is prevented from flowing outwardly by the seating of the valve 57". A valve retaining member 60" fits loosely in the inner end of the cylinder 25" and is held in position by means of the coil spring 78", the latter serving also to exert an outward thrust on the piston 26" and thus tending to move the piston stem 28" outwardly into engagement with the lower end of the valve stem 12 as in the forms of the invention hereinbefore described. A closure member 30" which serves as a guide for the outer end of the piston stem is disposed in the outer end of the casing 24" and is retained therein by means of a locking ring 33".

In this form of the invention the parts are assembled in much the same manner as is the arrangement shown in Figure 2. The valve 57", the spring 59", and the spring 78" are first inserted in the closed end of the cylinder 25". The flexible sleeve 40" is secured to the clips 80 and 81 by crimping over and the clip 81 is pressed or shrunk on the inner end of the piston stem 28". The unit thus assembled is inserted in the casing 24" which has been previously filled with liquid and as the piston is pressed downwardly, the liquid flows out through the passage 50" into the reservoir 65" and is discharged through an opening 83 formed in the wall of the casing 24". As the clip 80 reaches its seating position, the opening 83 is closed and by reason of the press fit between the clip 80 and the casing 24", the fluid system is thus completely sealed. If desired, a plug 85 may be driven into the opening 83 to further ensure against leakage. The closure member 30" is now seated and locked in position by the ring 33" and the device is ready for handling and shipment and may be readily applied to conventional valve mechanism in the manner hereinbefore described in connection with other embodiments of the invention.

It is of course desired that the sleeve 40" will yield readily to permit expansion of liquid on increase of temperature, and as this sleeve is ordinarily formed of material which is quite thin, the inertia of the liquid within the reservoir 65" as the tappet 20" reciprocates rapidly is likely to collapse the sleeve. It is to prevent such collapse that the reinforcing member 84 is provided.

In all of the forms of the invention hereinbefore described it is preferred that a separate manually adjustable device be associated with the tappet, and similar devices have been illustrated in the drawings, but it will be appreciated that this feature may be eliminated if desired and reliance placed solely on the automatically operating portion of the tappet to eliminate clearance in the valve actuating mechanism.

It will be understood that I do not wish to be confined to the precise construction illustrated in the drawings and described specifically herein; various further modifications and alterations will readily occur to one skilled in the art to which the invention relates.

Having thus described the invention, what is claimed as new and desired to be secured by Letters Patent is:

1. In a valve take-up device, the combination of a casing comprising a cylinder, a piston reciprocable in said cylinder, and elastic means associated with said cylinder and piston and exerting thrust therebetween to effect relative displacement thereof, said elastic means cooperating with said cylinder to form a sealed fluid system within said casing.

2. In a valve take-up device, the combination of a casing comprising a cylinder, a piston reciprocable in said cylinder, deformable elastic means operatively connected between said piston and cylinder, said means being initially stressed to urge the piston outwardly of the cylinder and cooperating with said cylinder and piston to form a closed, liquid-tight system within said casing.

3. In a valve take-up device, the combination with a cylinder, a piston reciprocable in said cylinder, deformable elastic means including rubber operatively connected between said piston and cylinder, said means being initially stressed to urge the piston outwardly of the cylinder and cooperating with said cylinder and piston to form a closed, liquid-tight system.

4. In a valve take-up device, the combination with a cylinder, a piston reciprocable in said cylinder, deformable elastic means comprising a flexible metallic bellows operatively connected between said piston and cylinder, said means being initially stressed to urge the piston outwardly of the cylinder and cooperating with said cylinder and piston to form a closed, liquid-tight system.

5. In an automatically expansible valve take-up device, the combination with a piston, of a unitary member affording a cylinder portion for the reception of said piston, said cylinder portion and piston constituting a part of a closed fluid system resisting compression of said device, and elastic means acting between said member and said piston to yieldingly expand said device, said elastic means constituting a closure element for said fluid system to prevent discharge of fluid therefrom, said fluid system lying wholly within said member.

6. In an automatically expansible valve take-up device, the combination with a piston, of a unitary member affording a cylinder portion for the reception of said piston, said cylinder portion and piston constituting a part of a closed fluid system resisting compression of said device, and elastic means formed of non-metallic deformable material acting between said member and said piston to yieldingly expand said device, said elastic means constituting a closure element for said fluid system to prevent discharge of fluid therefrom.

7. In an automatically expansible valve take-up device, the combination with a piston, of a unitary member affording a cylinder portion for the reception of said piston, said cylinder portion and piston constituting a part of a closed fluid system resisting compression of said device, and elastic means formed of a material including rubber acting between said member and said piston to yieldingly expand said device, said elastic means constituting a closure element for said fluid system to prevent discharge of fluid therefrom.

8. In an automatically expansible valve take-up device, the combination with a piston, of a unitary member affording a cylinder portion for the reception of said piston, said cylinder portion and piston constituting a part of a closed fluid system resisting compression of said device, and elastic means comprising a metallic extensible bellows acting between said member and said piston to yieldingly expand said device, said elastic means constituting a closure element for said fluid system to prevent discharge of fluid therefrom.

9. In an automatically expansible valve take-up device, the combination with a piston, of a unitary member affording a cylinder portion for the reception of said piston, said cylinder portion and piston constituting a part of a closed fluid system resisting compression of said device, said system being completely filled with incompressible fluid, and means formed of a non-metallic deformable material extending between and operatively secured to said cylinder and piston to form a closure for said fluid system, said means yielding to afford increased capacity in said system on expansion of the fluid when heated.

10. In an automatically expansible valve take-up device, the combination with a piston, of a unitary member affording a cylinder portion for the reception of said piston, said cylinder portion and piston constituting a part of a closed fluid system resisting compression of said device, elastic means acting between said member and said piston to yieldingly expand said device, and means for completely sealing said system, said last named means including rubber.

11. In an automatically expansible valve take-up device, the combination with a piston, of a unitary member affording a cylinder portion for the reception of said piston, said cylinder portion and piston constituting a part of a closed fluid system resisting compression of said device, elastic means acting between said member and said piston to yieldingly expand said device, and means for completely sealing said system, said last named means comprising a rubber sheath secured at opposite ends thereof to said piston and cylinder respectively.

12. In an automatically expansible valve take-up device, the combination with a piston of a unitary member affording a cylinder portion for the reception of said piston, said cylinder portion and piston constituting a part of a closed fluid system resisting compression of said device, elastic means acting between said member and said piston to yieldingly expand said device, means for completely sealing said system, said last named means comprising a rubber sheath secured at opposite ends thereof to said piston and cylinder respectively, and a rigid reinforcing element engaging said sheath to prevent collapse thereof by movement of the fluid within the system.

13. A valve tappet operable automatically to take up clearance comprising a generally cylindrical casing, means carried by said casing for transmitting thrust to a poppet valve, said last named means including a valve stem engaging member supported within said casing for sliding movement in an axial direction, a cylinder associated with said casing and having one closed end, a piston carried by said member and movable in said cylinder, said piston and cylinder being constructed to provide a restricted fluid passage from one side to the other side of said piston, one-way valve means including a valve and valve spring permitting fluid flow into said cylinder only, spring means urging said piston and member outwardly of said cylinder, and valve retaining means positioning said valve spring and valve in said casing, said valve retaining means being engaged and maintained in position in said casing by said spring means.

14. As an article of manufacture, a valve tappet automatically adjustable as to effective length and of dimensions comparable with those of conventional non-adjustable tappets, said tappet including a cylinder and piston which are elements of a sealed fluid system completely filled with liquid, elastic means acting between said cylinder and piston urging the latter outwardly of the cylinder, said elastic means sealing said system against discharge of liquid, the elements of said tappet being secured in operative relation to form a complete and self-contained unit, said fluid system being disposed wholly within the confines of said casing.

15. As an article of manufacture, a valve tappet automatically adjustable as to effective length and of dimensions comparable with those of conventional non-adjustable tappets, said tappet including a cylinder and piston which are elements of a sealed fluid system including said cylinder completely filled with liquid, rubber means surface bonded to said cylinder and piston and urging the latter outwardly of the cylinder, said rubber means sealing said system against discharge of liquid, the elements of said tappet being secured in operative relation to form a complete and self-contained unit, said fluid system being disposed wholly within the confines of said casing.

16. A valve tappet operable automatically to take up clearance comprising a generally cylindrical casing, means carried by said casing for transmitting thrust to a poppet valve, said last named means including a valve stem engaging member supported within said casing for sliding movement in an axial direction, a cylinder associated with said casing and having one closed end, a piston carried by said member and movable in said cylinder, said piston and cylinder being constructed to provide a restricted fluid passage from one side to the other side of said piston, one-way valve means including a valve and valve spring permitting fluid flow into said cylinder only, said piston being provided with a valve-controlled passage with which said valve cooperates, and means for positioning and retaining said valve and valve spring in the inner end of said cylinder, whereby said valve controlled passage may remain open during introduction of said piston into said cylinder during assembly of the tappet to facilitate discharge of air from said cylinder.

17. In an automatically expansible valve take-up device, the combination with a casing formed to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, and means forming with said reservoir and cylinder a closed fluid system, said last named means including a longitudinally extensible bellows secured to said piston at points adjacent the cylinder and to the casing at points remote from said cylinder.

18. In an automatically expansible valve take-up device, the combination with a casing formed to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, and means forming with said reservoir and cylinder a closed fluid system, said last named means including a longitudinally extensible bellows disposed wholly within said casing, said bellows being secured to said piston at points adjacent the cylinder and to the casing at points remote from said cylinder.

19. In an automatically expansible valve take-up device, the combination with a casing of generally cylindrical form having an open end and a closed end, said casing being formed adjacent the closed end to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, and means forming with said reservoir and cylinder a closed fluid system, said last named means including a longitudinally extensible bellows secured to said piston adjacent the cylinder and to the casing adjacent the open end thereof.

20. In an automatically expansible valve take-up device, the combination with a casing formed to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, and means forming with said reservoir and cylinder a closed fluid system, said last named means including a longitudinally extensible bellows secured to said piston and to said casing, said bellows being initially stressed or deformed so as to yieldingly urge said piston outwardly of said cylinder.

21. In an automatically expansible valve take-up device, the combination with a casing formed to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, and means forming with said reservoir and cylinder a closed fluid system, said last named means including a longitudinally extensible device connected between said piston and said casing, the connection of said device to said casing including a member to which said device is secured, said member having a press fit with said casing.

22. In an automatically expansible valve take-up device, the combination with a casing formed to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, and means forming with said reservoir and cylinder a closed fluid system disposed wholly within said casing, said last named means including a longitudinally extensible bellows connected between said piston and said casing.

23. In an automatically expansible valve take-up device, the combination with a casing of generally cylindrical form having an open end and a closed end, said casing being formed adjacent the closed end to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, means forming with said reservoir and cylinder a closed fluid system, said last named means including a longitudinally extensible device secured to said piston adjacent the cylinder and to the casing adjacent the open end thereof, and a member having a press fit within said casing, said member being secured to said device.

24. In an automatically expansible valve take-up device, the combination with a casing formed to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, means forming with said reservoir and cylinder a closed fluid system disposed wholly within said casing, and means whereby said fluid system may be completely filled with liquid, said means including an aperture formed in the head end of said cylinder, and a closure element receivable in said aperture.

25. In an automatically expansible valve take-up device, the combination with a casing formed to provide a cylinder, of a piston movable in said cylinder, means yieldingly urging said piston outwardly of said cylinder, a fluid reservoir supplying liquid to said cylinder on outward movement of the piston, means resisting rapid discharge of liquid from said cylinder, and means forming with said reservoir and cylinder a closed fluid system completely filled with liquid, said last named means including a longitudinally extensible bellows secured to said piston at points adjacent the cylinder and to the casing at points remote from said cylinder.

26. As an article of manufacture, a valve tappet automatically adjustable as to effective length and of dimensions comparable with those of conventional non-adjustable tappets, said tappet including a cylinder and piston, a sealed fluid system including said cylinder completely filled with liquid, elastic means comprising a metallic bellows acting between said cylinder and piston urging the latter outwardly of the cylinder, said elastic means sealing said system against discharge of liquid, and means whereby the elements of said tappet are locked in operative relation to form a complete and self-contained unit, said fluid system being disposed wholly within the confines of said casing.

FRANK C. BEST.